(12) United States Patent
Archer et al.

(10) Patent No.: US 8,037,213 B2
(45) Date of Patent: *Oct. 11, 2011

(54) REPLENISHING DATA DESCRIPTORS IN A DMA INJECTION FIFO BUFFER

(75) Inventors: Charles J. Archer, Rochester, MN (US); Michael A. Blocksome, Rochester, MN (US); Bob R. Cernohous, Rochester, MN (US); Philip Heidelberger, Cortlandt Manor, NY (US); Sameer Kumar, White Plains, NY (US); Jeffrey J. Parker, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1013 days.

This patent is subject to a terminal disclaimer.

(21) Appl. No.: 11/755,501

(22) Filed: May 30, 2007

(65) Prior Publication Data

US 2010/0268852 A1    Oct. 21, 2010

(51) Int. Cl.
*G06F 3/00* (2006.01)
*H04L 12/28* (2006.01)

(52) U.S. Cl. .......................... 710/22; 370/389
(58) Field of Classification Search ............ 710/22; 370/389
See application file for complete search history.

(56) References Cited

U.S. PATENT DOCUMENTS

| | | |
|---|---|---|
| 4,933,846 A | 6/1990 | Humphrey et al. |
| 5,050,162 A | 9/1991 | Golestani |
| 5,136,582 A | 8/1992 | Firoozmand |
| 5,437,042 A * | 7/1995 | Culley et al. ........... 710/28 |
| 5,448,698 A | 9/1995 | Wilkes |
| 5,617,537 A | 4/1997 | Yamada et al. |
| 5,680,116 A | 10/1997 | Hashimoto et al. |
| 5,689,509 A | 11/1997 | Gaytan et al. |
| 5,758,075 A | 5/1998 | Graziano et al. |
| 5,790,530 A | 8/1998 | Moh et al. |
| 5,796,735 A | 8/1998 | Miller et al. |
| 5,802,366 A | 9/1998 | Row et al. |
| 5,954,794 A | 9/1999 | Fishler et al. |
| 5,961,659 A | 10/1999 | Benner |
| 6,070,189 A | 5/2000 | Bender et al. |

(Continued)

OTHER PUBLICATIONS

Kumar et al., A Network on Chip Architecture and Design Methodolgoy, IEEE Computer Society Annual Symposium on VLSI, 2002.*

(Continued)

*Primary Examiner* — Henry Tsai
*Assistant Examiner* — Hyun Nam
(74) *Attorney, Agent, or Firm* — Biggers & Ohanian, LLP

(57) ABSTRACT

Methods, apparatus, and products are disclosed for replenishing data descriptors in a Direct Memory Access ('DMA') injection first-in-first-out ('FIFO') buffer that include: determining, by a messaging module on an origin compute node, whether a number of data descriptors in a DMA injection FIFO buffer exceeds a predetermined threshold, each data descriptor specifying an application message for transmission to a target compute node; queuing, by the messaging module, a plurality of new data descriptors in a pending descriptor queue if the number of the data descriptors in the DMA injection FIFO buffer exceeds the predetermined threshold; establishing, by the messaging module, interrupt criteria that specify when to replenish the injection FIFO buffer with the plurality of new data descriptors in the pending descriptor queue; and injecting, by the messaging module, the plurality of new data descriptors into the injection FIFO buffer in dependence upon the interrupt criteria.

18 Claims, 10 Drawing Sheets

U.S. PATENT DOCUMENTS

| | | | |
|---|---|---|---|
| 6,072,781 | A | 6/2000 | Feeney et al. |
| 6,105,122 | A | 8/2000 | Muller et al. |
| 6,161,198 | A | 12/2000 | Hill et al. |
| 6,356,951 | B1 | 3/2002 | Gentry, Jr. |
| 6,711,632 | B1 | 3/2004 | Chow et al. |
| 6,735,662 | B1 | 5/2004 | Connor |
| 6,744,765 | B1 | 6/2004 | Dearth et al. |
| 6,754,732 | B1 | 6/2004 | Dixon et al. |
| 6,857,030 | B2 | 2/2005 | Webber |
| 6,977,894 | B1 | 12/2005 | Achilles et al. |
| 6,981,074 | B2 | 12/2005 | Oner et al. |
| 7,031,305 | B1 | 4/2006 | Yu et al. |
| 7,089,289 | B1 | 8/2006 | Blackmore et al. |
| 7,111,092 | B1 | 9/2006 | Mitten et al. |
| 7,120,916 | B1 | 10/2006 | Firth et al. |
| 7,155,541 | B2 | 12/2006 | Ganapathy et al. |
| 7,890,670 | B2 | 2/2011 | Archer et al. |
| 2003/0233497 | A1 | 12/2003 | Shih |
| 2004/0057380 | A1 | 3/2004 | Biran et al. |
| 2004/0078405 | A1 | 4/2004 | Bhanot et al. |
| 2004/0218631 | A1 | 11/2004 | Ganfield |
| 2005/0033874 | A1 | 2/2005 | Futral et al. |
| 2005/0078669 | A1* | 4/2005 | Oner ............................. 370/389 |
| 2005/0091334 | A1 | 4/2005 | Chen et al. |
| 2005/0114561 | A1 | 5/2005 | Lu et al. |
| 2005/0198113 | A1 | 9/2005 | Mohamed et al. |
| 2005/0213570 | A1* | 9/2005 | Stacy et al. .................. 370/389 |
| 2006/0045005 | A1 | 3/2006 | Blackmore et al. |
| 2006/0045109 | A1 | 3/2006 | Blackmore et al. |
| 2006/0047771 | A1 | 3/2006 | Blackmore et al. |
| 2006/0056405 | A1 | 3/2006 | Chang et al. |
| 2006/0075057 | A1 | 4/2006 | Gildea et al. |
| 2006/0190640 | A1* | 8/2006 | Yoda et al. ....................... 710/52 |
| 2006/0206635 | A1 | 9/2006 | Alexander et al. |
| 2006/0218429 | A1* | 9/2006 | Sherwin et al. ............... 713/600 |
| 2006/0230119 | A1 | 10/2006 | Hausauer et al. |
| 2006/0253619 | A1 | 11/2006 | Torudbakken et al. |
| 2007/0041383 | A1 | 2/2007 | Banikazemi et al. |
| 2007/0165672 | A1 | 7/2007 | Keels et al. |
| 2008/0109573 | A1 | 5/2008 | Leonard et al. |
| 2008/0222317 | A1 | 9/2008 | Go et al. |
| 2008/0273543 | A1 | 11/2008 | Blocksome et al. |
| 2009/0125604 | A1 | 5/2009 | Chang et al. |
| 2009/0276582 | A1 | 11/2009 | Furtek et al. |
| 2010/0082848 | A1* | 4/2010 | Blocksome et al. ............. 710/22 |

OTHER PUBLICATIONS

Office Action Dated Apr. 1, 2010 in U.S. Appl. No. 11/739,948.
Office Action Dated Feb. 5, 2010 in U.S. Appl. No. 11/746,333.
Office Action Dated Apr. 1, 2010 in U.S. Appl. No. 11/829,339.
Final Office Action Dated Mar. 8, 2010 in U.S. Appl. No. 11/829,334.
Final Office Action Dated Feb. 23, 2010 in U.S. Appl. No. 11/776,718.
U.S. Appl. No. 11/776,707, filed Jul. 12, 2007, Blocksome.
U.S. Appl. No. 11/739,948, filed Apr. 25, 2007, Blocksome, et al.
U.S. Appl. No. 11/740,361, filed Apr. 26, 2007, Archer et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 30, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Watson, Robert, "DMA Controller Programming in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
Moreira, et al.; The Blue Gene/L Supercomputer: A Hardware and Software Story; International Journal of Parallel Programming; Jun. 2007; pp. 181-206; vol. 35, No. 3; Springer Science+Business Media, LLC; USA.
Office Action U.S. Appl. No. 11/764,302, Jul. 28, 2010.
Office Action U.S. Appl. No. 11/776,707, Jul. 14, 2010.
Notice of Allowance U.S. Appl. No. 11/746,333, Jun. 23, 2010.
Notice of Allowance U.S. Appl. No. 11/829,325, May 21, 2010.
Notice of Allowance U.S. Appl. No. 11/739,948, Jul. 7, 2010.
Office Action U.S. Appl. No. 11/740,361, Apr. 30, 2010.
Kumar et al., A Network on Chip Architecture and Design Methodology, IEEE Computer Society Annual Symposium on VLSI, 2002.
Final Office Action U.S. Appl. No. 11/776,707, Jan. 6, 2011.
Final Office Action U.S. Appl. No. 11/740,361, Oct. 4, 2010.
Office Action U.S. Appl. No. 11/755,501, Nov. 26, 2010.
Office Action Dated Sep. 18, 2009 in U.S. Appl. No. 11/829,334.
Office Action Dated Sep. 15, 2009 in U.S. Appl. No. 11/829,339.
Office Action Dated Nov. 24, 2009 in U.S. Appl. No. 11/829,325.
Notice of Allowance, U.S. Appl. No. 11/754,719, USPTO Mail date Apr. 6, 2010.
Office Action, U.S. Appl. No. 11/744,319, USPTO Mail date May 12, 2010.
Office Action, U.S. Appl. No. 11/829,317, USPTO Mail date May 26, 2010.
Final Office Action, U.S. Appl. No. 11/746,348, USPTO Mail date Feb. 23, 2010.
Notice of Allowance, U.S. Appl. No. 11/758,167, USPTO Mail Date Mar. 12, 2010.
Office Action, U.S. Appl. No. 11/754,719, USPTO Mail Date Oct. 14, 2008.
Office Action, U.S. Appl. No. 11/754,719, USPTO Mail Date Mar. 4, 2009.
Office Action, U.S. Appl. No. 11/758,167, USPTO Mail Date Nov. 21, 2008.
Office Action, U.S. Appl. No. 11/744,296, USPTO Mail Date Aug. 20, 2009.
Office Action, U.S. Appl. No. 11/746,348, USPTO Mail Date Sep. 2, 2009.
Final Office Action, U.S. Appl. No. 11/758,167, USPTO Mail Date Apr. 24, 2009.
Final Office Action, U.S. Appl. No. 11/754,719, USPTO Mail Date Aug. 5, 2009.
Final Office Action, U.S. Appl. No. 11/744,296, USPTO Mail Date Feb. 24, 2010.
Notice of Allowance, U.S. Appl. No. 11/746,348, USPTO Mail Date Oct. 5, 2010.

* cited by examiner

REPLENISHING DATA DESCRIPTORS IN A DMA INJECTION FIFO BUFFER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for replenishing data descriptors in a DMA injection FIFO buffer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost. Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

When a parallel application running on a compute node transmits a message to another compute node connected to the data communications network, the application typically provides messaging software with a pointer to an application buffer storing the message. The messaging software creates a data descriptor that describes the message and injects the data descriptor in an injection first-in-first-out ('FIFO') buffer for a direct memory access ('DMA') engine. The DMA engine, in turn, processes the data descriptor and sends the message through the network using a DMA transfer operation. The problem often arises, however, that the injection FIFO buffer becomes full of data descriptors because the DMA engine cannot process the descriptors as fast as the messaging software injects the descriptors into the injection FIFO buffer. Readers will therefore appreciate advancements in administering the injections of data descriptors in the DMA injection FIFO buffer, and in particular advancements in replenishing data descriptors in the DMA injection FIFO buffer.

SUMMARY OF THE INVENTION

Methods, apparatus, and products are disclosed for replenishing data descriptors in a Direct Memory Access ('DMA') injection first-in-first-out ('FIFO') buffer that include: determining, by a messaging module on an origin compute node, whether a number of data descriptors in a DMA injection FIFO buffer exceeds a predetermined threshold, each data descriptor specifying an application message for transmission to a target compute node; queuing, by the messaging module, a plurality of new data descriptors in a pending descriptor queue if the number of the data descriptors in the DMA injection FIFO buffer exceeds the predetermined threshold; establishing, by the messaging module, interrupt criteria that specify when to replenish the injection FIFO buffer with the plurality of new data descriptors in the pending descriptor queue; and injecting, by the messaging module, the plurality of new data descriptors into the injection FIFO buffer in dependence upon the interrupt criteria.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
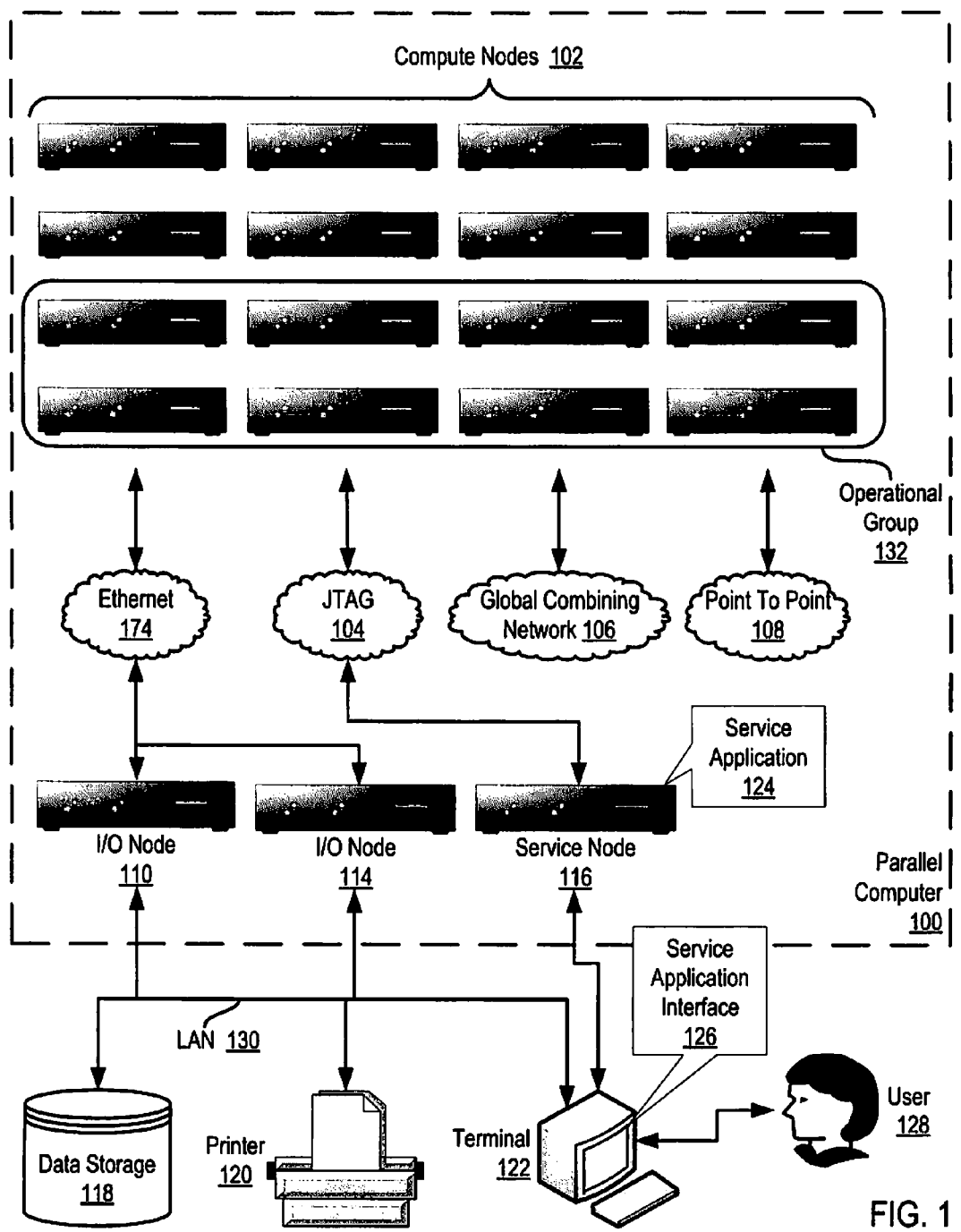
FIG. 1 illustrates an exemplary system for replenishing data descriptors in a DMA injection FIFO buffer according to embodiments of the present invention.

Exemplary methods, apparatus, and computer program products for replenishing data descriptors in a DMA injection FIFO buffer according to embodiments of the present invention are described with reference to the accompanying drawings, beginning with FIG. 1. FIG. 1 illustrates an exemplary system for replenishing data descriptors in a DMA injection FIFO buffer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.' 'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for replenishing data descriptors in a DMA injection FIFO buffer according to embodiments of the present invention. The system of FIG. 1 operates generally for replenishing data descriptors in a DMA injection FIFO buffer according to embodiments of the present invention as follows: A messaging module on an origin compute node determines whether a number of data descriptors in a DMA injection FIFO buffer exceeds a predetermined threshold. If the number of the data descriptors in the DMA injection FIFO buffer exceeds the predetermined threshold, then the messaging module queues a plurality of new data descriptors in a pending descriptor queue. The messaging module establishes interrupt criteria that specify when to replenish the injection FIFO buffer with the plurality of new data descriptors in the pending descriptor queue. The messaging module then injects the plurality of new data descriptors into the injection FIFO buffer in dependence upon the interrupt criteria. In this specification, readers will note that the origin compute node is a compute node attempting to transmit a message, while the target compute node is a compute node intended as the recipient of the message.

A data descriptor is a data structure that specifies a message for transmission to a target compute node and specifies transmission data related to the message. For example, a data descriptor may describe the address of the buffer storing the message and the size of the message and may specify the particular message type of the message and the packet headers to be used in transmitting the message. The data descriptor may also specify a data transfer operation for transferring the application message to the target compute node.

Interrupt criteria are conditions established by the messaging module that generate a processor interrupt on the origin compute node to allow the messaging module to resume processing control of the processor in order to inject new data descriptors stored in the pending descriptor queue into the DMA injection FIFO buffer. The interrupt criteria may be implemented as the expiration of an interrupt timer or the processing of a replenish descriptor by the DMA engine. A replenish descriptor is a special type of data descriptor specifying a DMA data transfer operation carried out locally on the origin compute node to notify the messaging module when to replenish the injection FIFO buffer with the plurality of new data descriptors in the pending descriptor queue.

The arrangement of nodes, networks, and I/O devices making up the exemplary system illustrated in FIG. 1 are for explanation only, not for limitation of the present invention. Data processing systems capable of replenishing data descriptors in a DMA injection FIFO buffer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of replenishing data descriptors in a DMA injection FIFO buffer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Replenishing data descriptors in a DMA injection FIFO buffer according to embodiments of the present invention may be generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of replenishing data descriptors in a DMA injection FIFO buffer according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application (158) of FIG. 2 allocates an application buffer for storing a message for transmission to another compute node.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
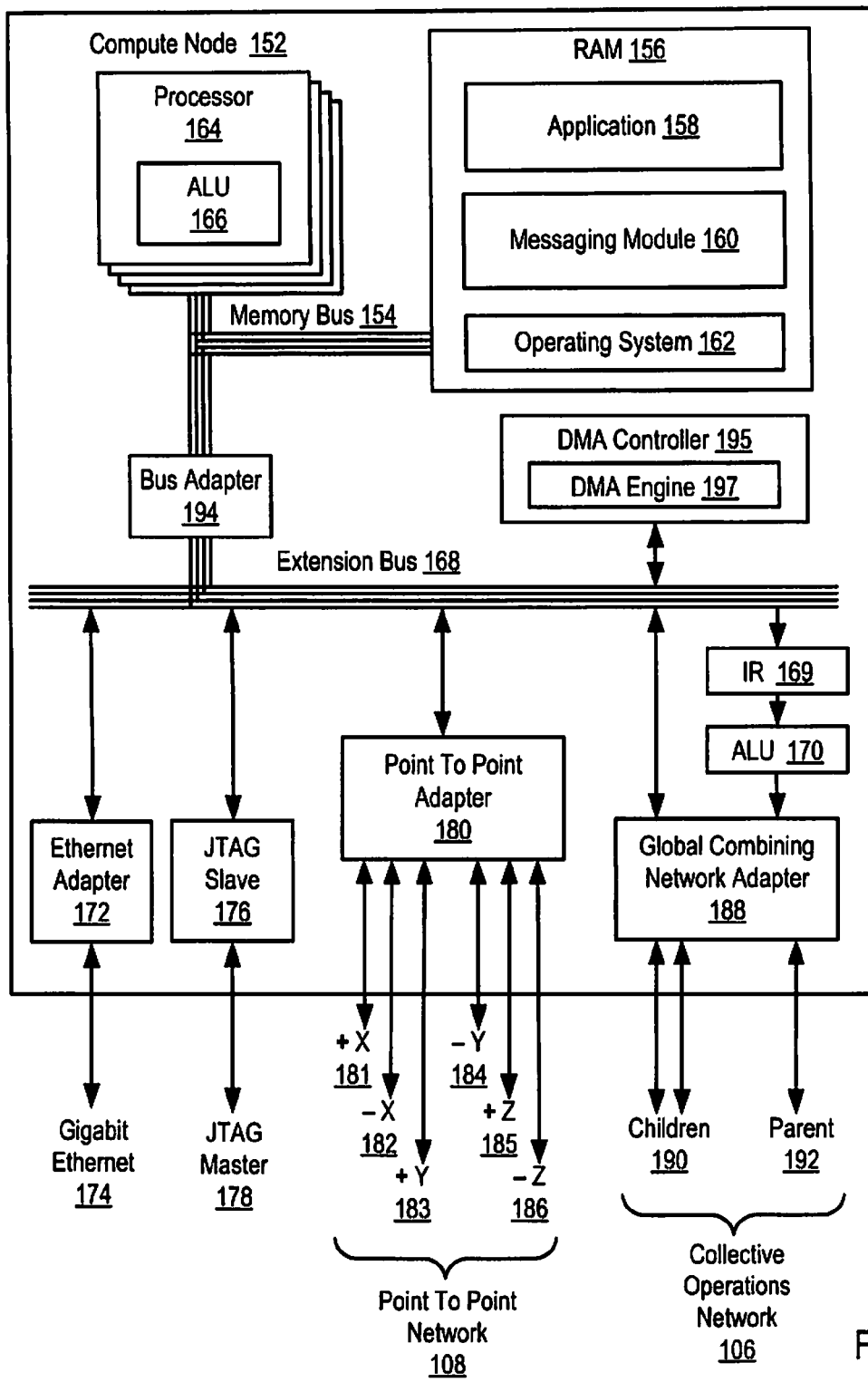
FIG. 2 sets forth a block diagram of an exemplary compute node useful in a parallel computer capable of replenishing data descriptors in a DMA injection FIFO buffer according to embodiments of the present invention.

In the example of FIG. 2, the messaging module (160) operates generally to replenish data descriptors in a DMA injection FIFO buffer according to embodiments of the present invention. The messaging module (160) operates generally to replenish data descriptors in a DMA injection FIFO buffer according to embodiments of the present invention by: determining whether a number of data descriptors in a DMA injection FIFO buffer exceeds a predetermined threshold, each data descriptor specifying an application message for transmission to a target compute node; queuing a plurality of new data descriptors in a pending descriptor queue if the number of the data descriptors in the DMA injection FIFO buffer exceeds the predetermined threshold; establishing interrupt criteria that specify when to replenish the injection FIFO buffer with the plurality of new data descriptors in the pending descriptor queue; and injecting the plurality of new data descriptors into the injection FIFO buffer in dependence upon the interrupt criteria.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for replenishing data descriptors in a DMA injection FIFO buffer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in replenishing data descriptors in a DMA injection FIFO buffer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
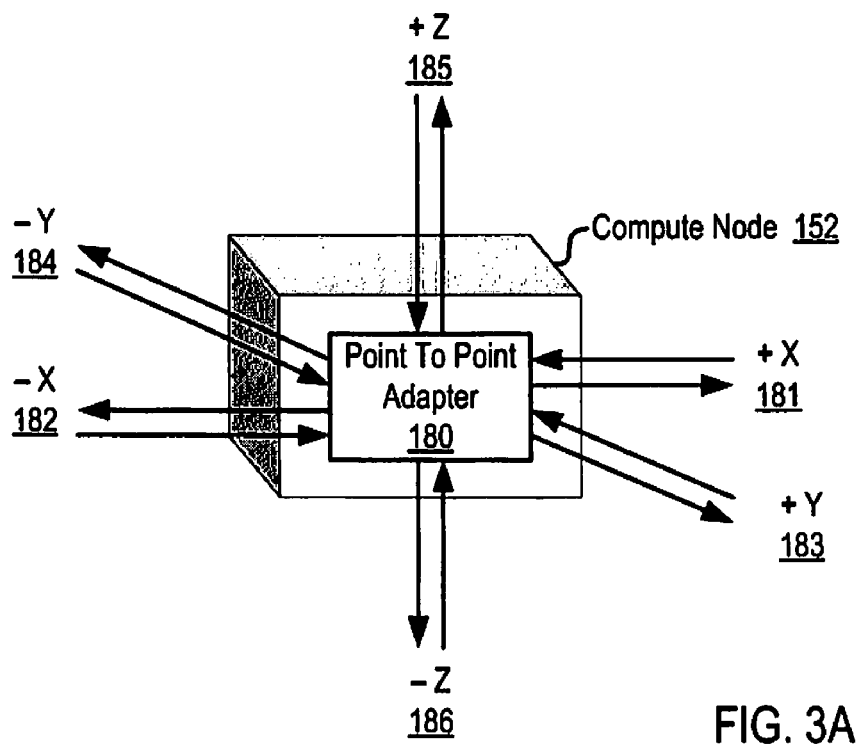
FIG. 3A illustrates an exemplary Point To Point Adapter useful in systems capable of replenishing data descriptors in a DMA injection FIFO buffer according to embodiments of the present invention.

For further explanation, FIG. 3A illustrates an exemplary Point To Point Adapter (180) useful in systems capable of replenishing data descriptors in a DMA injection FIFO buffer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
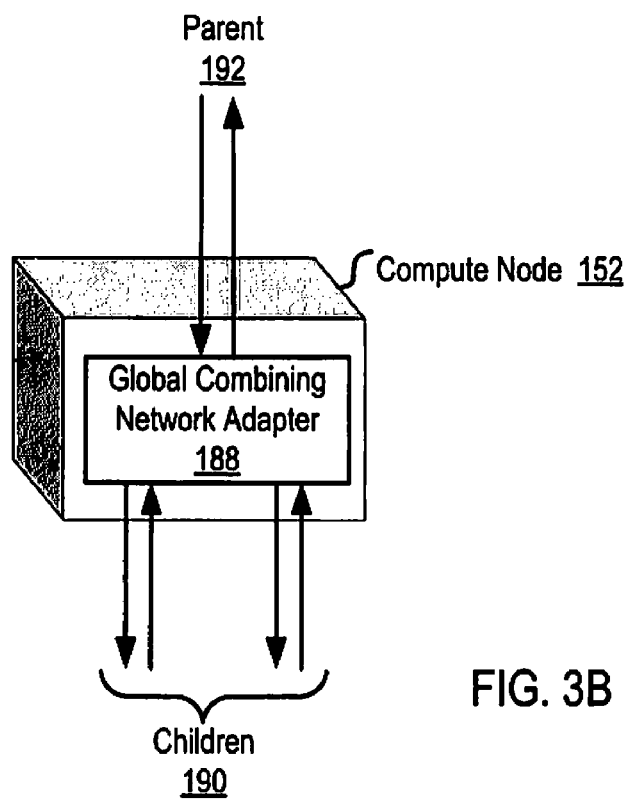
FIG. 3B illustrates an exemplary Global Combining Network Adapter useful in systems capable of replenishing data descriptors in a DMA injection FIFO buffer according to embodiments of the present invention.

For further explanation, FIG. 3B illustrates an exemplary Global Combining Network Adapter (188) useful in systems capable of replenishing data descriptors in a DMA injection FIFO buffer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
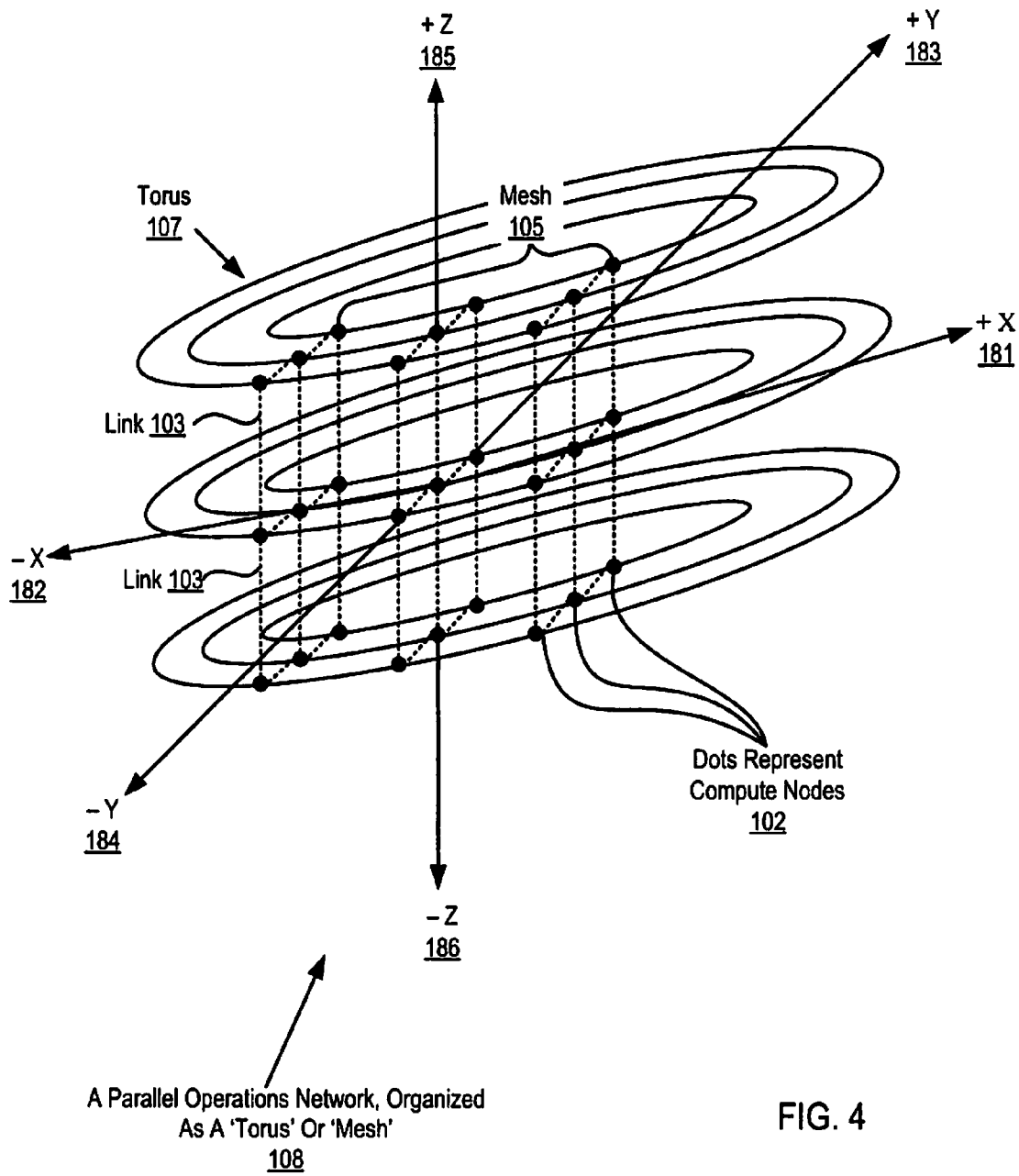
FIG. 4 sets forth a line drawing illustrating an exemplary data communications network optimized for point to point operations useful in systems capable of replenishing data descriptors in a DMA injection FIFO buffer in accordance with embodiments of the present invention.

For further explanation, FIG. 4 sets forth a line drawing illustrating an exemplary data communications network (108) optimized for point to point operations useful in systems capable of replenishing data descriptors in a DMA injection FIFO buffer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in replenishing data descriptors in a DMA injection FIFO buffer in accordance with embodiments of the present invention may contain only a few compute nodes or may contain thousands of compute nodes.

Figure 5:
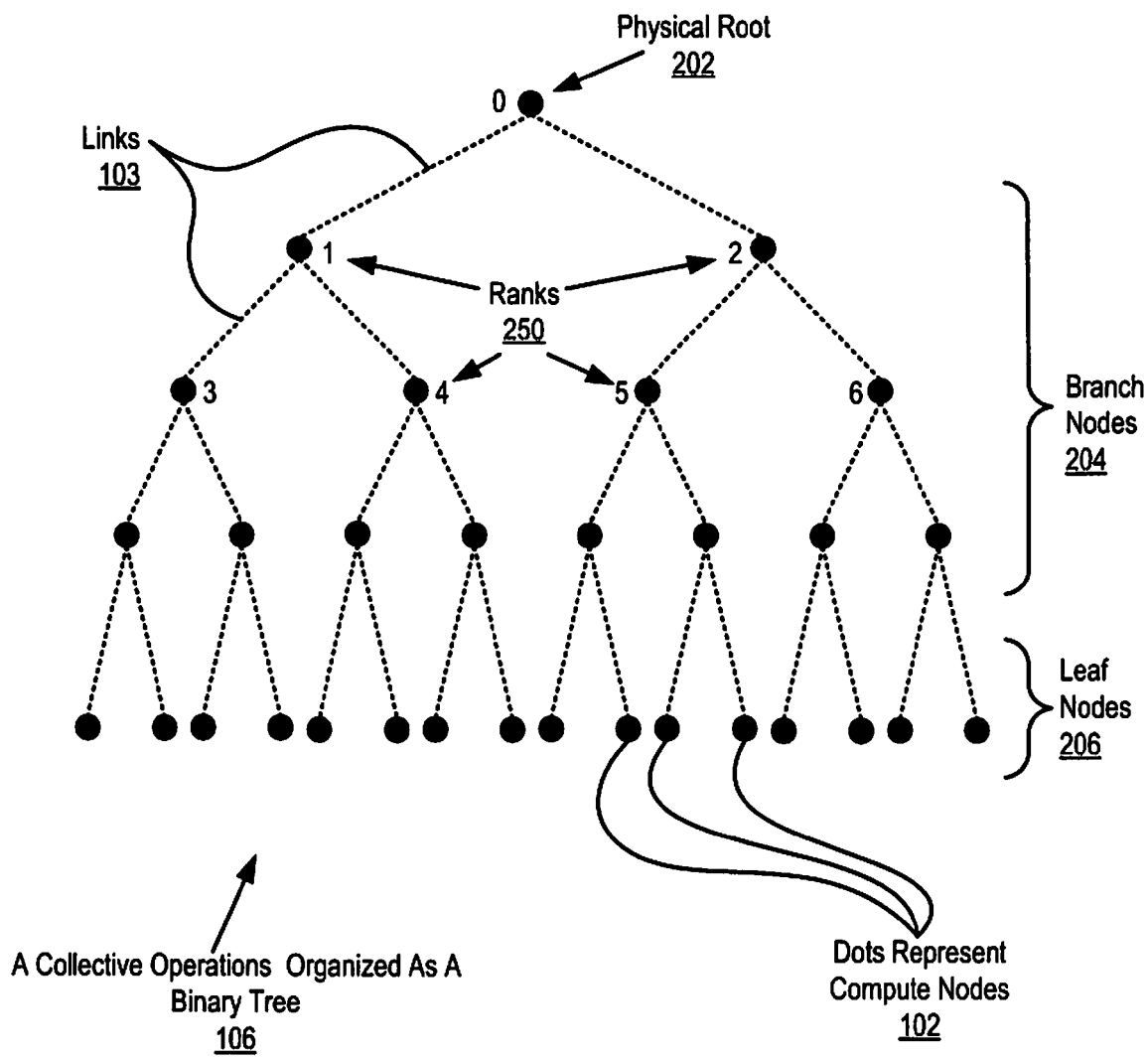
FIG. 5 sets forth a line drawing illustrating an exemplary data communications network optimized for collective operations useful in systems capable of replenishing data descriptors in a DMA injection FIFO buffer in accordance with embodiments of the present invention.

For further explanation, FIG. 5 sets forth a line drawing illustrating an exemplary data communications network (106) optimized for collective operations useful in systems capable of replenishing data descriptors in a DMA injection FIFO buffer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for replenishing data descriptors in a DMA injection FIFO buffer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
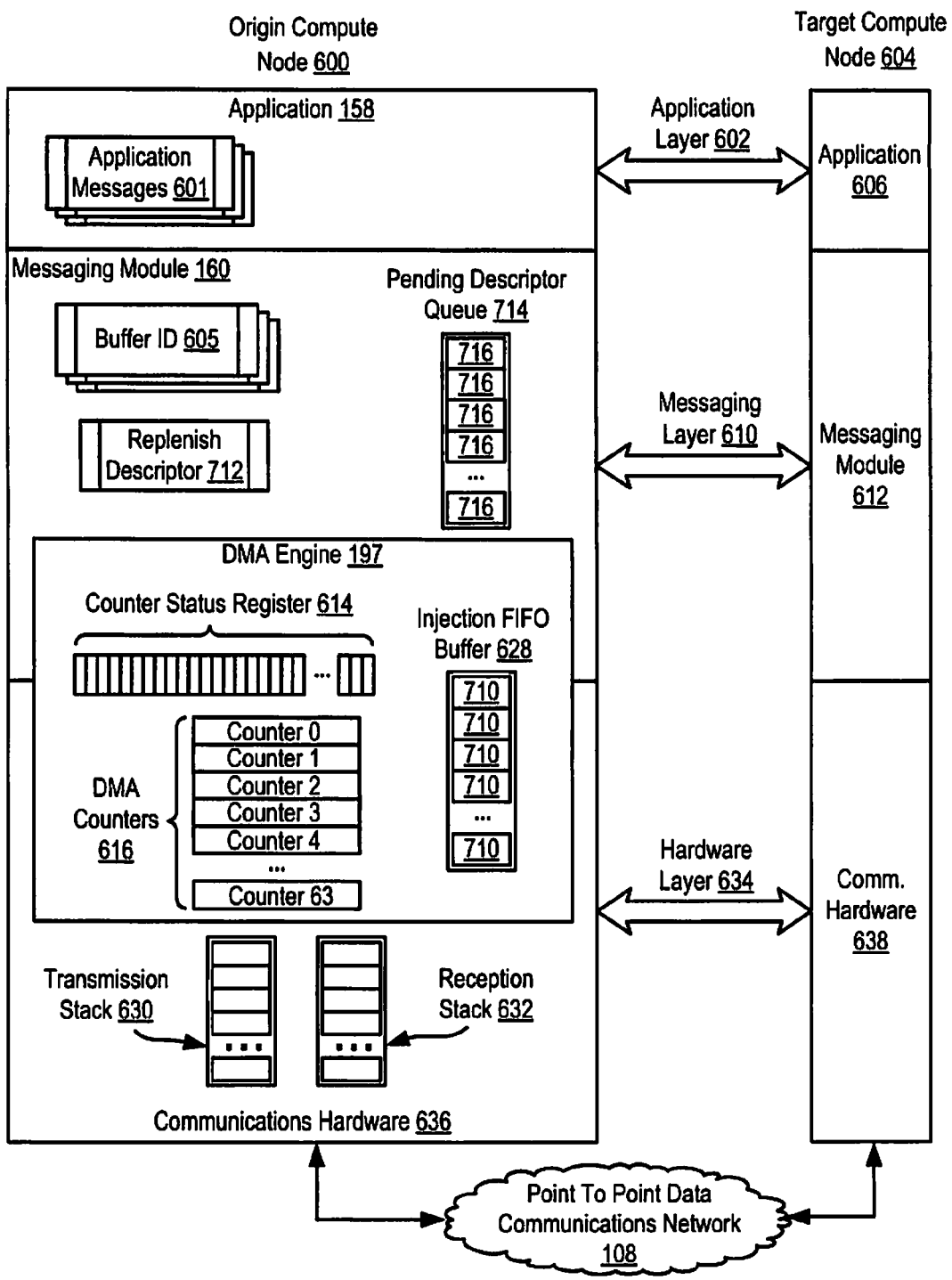
FIG. 6 sets forth a block diagram illustrating an exemplary communications architecture illustrated as a protocol stack useful in replenishing data descriptors in a DMA injection FIFO buffer according to embodiments of the present invention.

For further explanation, FIG. 6 sets forth a block diagram illustrating an exemplary communications architecture illustrated as a protocol stack useful in replenishing data descriptors in a DMA injection FIFO buffer according to embodiments of the present invention. The exemplary communications architecture of FIG. 6 sets forth two compute nodes, an origin compute node (600) and a target compute node (604). Only two compute nodes are illustrated in the example of FIG. 6 for ease of explanation and not for limitation. In fact, replenishing data descriptors in a DMA injection FIFO buffer according to embodiments of the present invention may be implemented using many compute nodes in very large scale computer systems such as parallel computers with thousands of nodes.

The exemplary communications architecture of FIG. 6 includes an application layer (602) composed of an application (158) installed on the origin compute node (600) and an application (606) installed on the target compute node (604). In the example of FIG. 6, the application (158) on the origin compute node (600) has an application message (601) for transmission to the application (606) on the target compute node (604). Data communications between applications (158, 606) are effected using messaging modules (160, 612) installed on each of the compute nodes (600, 604). Applications (158 and 606) may communicate by invoking function of an application programming interfaces ('API') exposed by the application messaging modules (606 and 612). To transmit application messages (601) to the application (606), the application (158) of FIG. 6 may invoke a function of an API for messaging module (160) that passes buffer identifiers (605) for an application buffers containing the application messages (601) to the messaging module (160).

The exemplary communications architecture of FIG. 6 includes a messaging layer (610) that implements data communications protocols for data communications that support messaging in the application layer (602). In the example of FIG. 6, the messaging layer (610) is composed of messaging module (160) installed on the origin compute node (600) and messaging module (612) installed on the target compute node (604). Each messaging module (160 and 612) exposes a set of APIs to its respective application (158 and 606) in the application layer (602). When an application invokes an API for the messaging module, the messaging module (160) of FIG. 6 receives the buffer identifier (605) from the application (158) through the messaging module's API exposed to the application (158). The messaging module (160) then creates a data descriptor (710) that specifies a DMA transfer operation for transferring the application message (601) from the origin compute node (600) to the target compute node (604) and injects that data descriptor (710) in an injection FIFO buffer (628) for a DMA engine (197) that processes the transmission.

The messaging module (160) of FIG. 6 operates generally for replenishing data descriptors in a DMA injection FIFO buffer according to embodiments of the present invention. The messaging module (160) determines whether a number of data descriptors (710) in a DMA injection FIFO buffer (628) exceeds a predetermined threshold and queues a plurality of new data descriptors (716) in a pending descriptor queue (714) if the number of the data descriptors (710) in the DMA injection FIFO buffer (628) exceeds the predetermined threshold. The messaging module (160) then establishes (718) interrupt criteria that specify when to replenish the injection FIFO buffer (628) with the plurality of new data descriptors (716) in the pending descriptor queue (714) and injects the plurality of new data descriptors (716) into the injection FIFO buffer (628) in dependence upon the interrupt criteria.

Interrupt criteria are conditions established by the messaging module (160) that generate a processor interrupt on the origin compute node (600) to allow the messaging module (160) to resume processing control of the processor in order to inject the plurality of new data descriptors (716) stored in the pending descriptor queue (714) into the DMA injection FIFO buffer (628). The interrupt criteria may be implemented as the expiration of an interrupt timer or the processing of a replenish descriptor (712) by the DMA engine. A replenish descriptor (712) is a special type of data descriptor specifying a DMA data transfer operation carried out locally on the origin compute node to notify the messaging module when to replenish the injection FIFO buffer with the plurality of new data descriptors in the pending descriptor queue. When the number of data descriptors (710) in a DMA injection FIFO buffer (628) exceeds a predetermined threshold, the messaging module (160) of FIG. 6 injects the replenish descriptor (712) into the injection FIFO buffer (628). After the DMA engine (197) processes the data descriptors (710) in the injection FIFO buffer (628), the DMA engine (197) will process the replenish descriptor (712), which in turn, generates an interrupt that allows the messaging module (160) to replenish the injection FIFO buffer (628) with the new data descriptors (716) stored in the pending descriptor queue (714).

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and many other factors for communications between the compute nodes (600 and 604) on the physical network medium. The hardware layer (634) of FIG. 6 is composed of communications hardware (636) of the origin compute node (600), communications hardware (638) of the target compute node (604), and the data communications network (108) connecting the origin compute node (600) to the target compute node (604). Such communications hardware may include, for example, point-to-point adapters and DMA controllers as described above with reference to FIGS. 2 and 3A. In the example of FIG. 6, the communications hardware (636) includes a transmission stack (630) for storing network packets for transmission to other communications hardware through the data communications network (108) and includes a reception stack (632) for storing network packets received from other communications hardware through the data communications network (108).

The exemplary communications architecture of FIG. 6 illustrates a DMA engine (197) for the origin compute node (600). The DMA engine (197) in the example of FIG. 6 is illustrated in both the messaging module layer (610) and the hardware layer (634). The DMA engine (197) is shown in both the messaging layer (610) and the hardware layer (634) because a DMA engine useful in replenishing data descriptors in a DMA injection FIFO buffer according to embodiments of the present invention may often provide messaging layer interfaces and also implement communications according to some aspects of the communication hardware layer (634). The exemplary DMA engine (197) of FIG. 6 includes an injection FIFO buffer (628) for storing data descriptors (710) that specify DMA transfer operations for transferring data such as, for example, a memory FIFO data transfer operation or a direct put operation. The data descriptors (710) of FIG. 6 stored in the injection FIFO buffer (628) may be regular data descriptors that specify messages to be sent to other DMA engines on other compute nodes or may be special replenish descriptors that are used to provide processing control to the messaging module (160) in order to replenish the injection FIFO buffer (628) with the new data descriptors (716) queued in the pending descriptor queue (714). Although not shown, the exemplary DMA engine (197) of FIG. 6 also includes a number of reception FIFO buffers used to store packets received from the network (108) through the communications hardware (636). Although FIG. 6 only illustrates a single injection FIFO buffer (628), readers will note that a DMA engine may have access to any number of injection FIFO buffers and reception FIFO buffers.

A memory FIFO data transfer operation is a mode of transferring data using DMA engines, typically a DMA engine on an origin node and a DMA engine on a target node. In a memory FIFO data transfer operation, data is transferred along with a data descriptor describing the data from an injection FIFO for the origin DMA engine to a target DMA engine. The target DMA engine in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

A direct put operation is a mode of transferring data using DMA engines, typically a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA transfers the data to be stored on the target compute node along with a specific identification of a storage location on the target compute node. The origin DMA knows the specific storage location on the target compute node because the specific storage location for storing the data on the target compute node has been previously provided by the target DMA to the origin DMA.

In addition to specifying DMA data transfer operations, each data descriptor (710) of FIG. 6 also specifies one of the DMA counters (616) for use in the DMA transfer operation specified by the data descriptor (710). Some or all of the DMA counters (616) may be implemented as shared DMA counters. A shared DMA counter is a DMA counter that is utilized concurrently for multiple data transfer operations. That is, more than one descriptor (710) in the injection FIFO buffer (628) may specify the same counter (616). The use of shared DMA counters helps to avoid the problem of having to pend data transfers until a dedicated DMA counter is available to be assigned to a data descriptor (710) for use in a DMA transfer operation. Dedicated DMA counters for each data transfer operation may not always be available because of the limited number of DMA counters typically allocated to the DMA engine. In fact, in many system configurations, the DMA engine may only have access to sixty-four DMA counters.

In traditional systems, the DMA counters are dedicated to a single data transfer operation and are not shared concurrently among multiple data descriptors. Dedicated DMA counters are used by the origin compute node to identify when a data transfer is complete. The DMA engine uses a dedicated DMA counter associated with a particular data descriptor to track the amount of message data remaining to be sent for that descriptor by setting the value of the counter to the size of the data to be transferred and decrementing the value of the counter as the data is transferred to the target compute node. Each DMA counter corresponds with a single bit in a counter status register (614). When the value of one of the counters reaches zero, the DMA engine sets the bit in the counter status register (614) that corresponds to the DMA counter that reached zero. When the processor polls the counter status register (614) and identifies that one of the bits in the counter status register (614) is set, the processor notifies the application initiating the data transfer that the data transfer is complete. The processor may poll the counter status register (614) periodically or in response to an interrupt generated by the DMA engine when a bit in the counter status register (614) is set.

As mentioned above, some of the DMA counters (616) may be implemented as shared DMA counters, which do not provide a way to track when a particular data transfer specified by a data descriptor is complete because a single shared DMA counter (616) is shared among multiple data descriptors. Because the shared DMA counters (616) in the example of FIG. 6 are not typically utilized to track the completion of a data transfer in systems capable of replenishing data descriptors in a DMA injection FIFO buffer according to the present invention, the origin DMA engine (197) disregards values for the shared DMA counters (616). The origin DMA engine (197) disregards values for the shared DMA counters (616) by disabling a counter hit zero interrupt that occurs when a counter reaches zero or simply not setting the bits in the counter status register (614) when a counter reaches zero.

Figure 7:
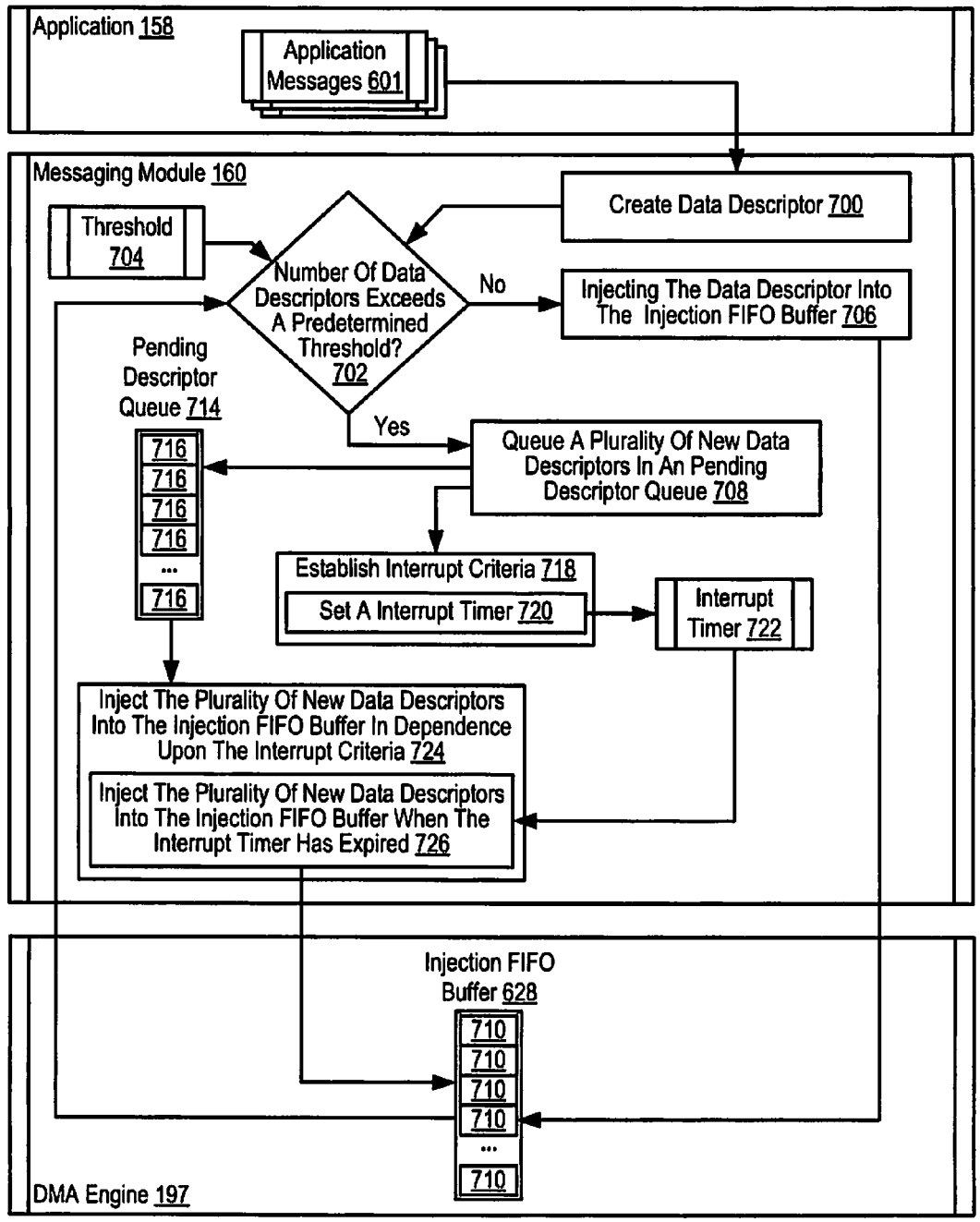
FIG. 7 sets forth a flow chart illustrating an exemplary method for replenishing data descriptors in a DMA injection FIFO buffer according to the present invention.

For further explanation, FIG. 7 sets forth a flow chart illustrating an exemplary method for replenishing data descriptors in a DMA injection FIFO buffer according to the present invention. The method of FIG. 7 includes creating (700), by the messaging module (160), a data descriptor for an application message (601). A data descriptor is a data structure that specifies a message for transmission to a target compute node and specifies transmission data related to the message. For example, a data descriptor may describe the address of the buffer storing the message and the size of the message and may specify the particular message type of the message and the packet headers to be used in transmitting the message. The data descriptor may also specify a data transfer operation for transferring the application message to the target compute node. The messaging module (160) may create (700) a data descriptor for an application message (601) according to the method of FIG. 7 in response to receiving, from an application (158), a buffer identifier of a buffer containing the application message (601) for transmission to target compute node. The application (158) may provide a buffer identifier to the messaging module (160) as a parameter to a 'send' messaging function of the messaging module (160) used by the application (158) to transmit the message (601) to the target compute node.

The method of FIG. 7 includes determining (702), by a messaging module (160) on an origin compute node, whether a number of data descriptors (710) in a DMA injection FIFO buffer (628) exceeds a predetermined threshold (704). Each data descriptor (710) of FIG. 7 in the DMA injection FIFO buffer (628) specifies an application message (601) for transmission to a target compute node. The predetermined threshold (704) of FIG. 7 represents the maximum number of data descriptors (710) that the messaging module (160) injects in the injection FIFO buffer (628) before queuing any new data descriptors (716) in a pending descriptor queue (714). The messaging module (160) may determine (702) whether a number of data descriptors (710) in a DMA injection FIFO buffer (628) exceeds a predetermined threshold (704) according to the method of FIG. 7 by comparing the number of data descriptors (710) in a DMA injection FIFO buffer (628) to the predetermined threshold (704). If the number of data descriptors (710) in a DMA injection FIFO buffer (628) is greater than the predetermined threshold (704), then the number of data descriptors (710) in the DMA injection FIFO buffer (628) exceeds the predetermined threshold (704). If the number of data descriptors (710) in a DMA injection FIFO buffer (628) is less than the predetermined threshold (704), then the number of data descriptors (710) in the DMA injection FIFO buffer (628) does not exceed the predetermined threshold (704).

The method of FIG. 7 includes injecting (706), by the messaging module (160), the data descriptor into the injection FIFO buffer (706) if the number of the data descriptors (710) in the DMA injection FIFO buffer (628) does not exceed the predetermined threshold (704). The messaging module (160) may inject (706) the data descriptor into the injection FIFO buffer (706) according to the method of FIG. 7 by passing the data descriptor to the DMA engine (197) through an API exposed by the DMA engine (197) for storage in the next available slot of injection FIFO buffer (628).

The method of FIG. 7 also includes queuing (708), by the messaging module (160), a plurality of new data descriptors (716) in a pending descriptor queue (714) if the number of the data descriptors (710) in the DMA injection FIFO buffer (628) exceeds the predetermined threshold (704). The data descriptors (716) in the example of FIG. 7 are 'new' in the sense that these descriptors (716) were created after the number of data descriptors (710) in the injection FIFO buffer (628) exceeded the predetermined threshold. The messaging module (160) may queue (708) a plurality of new data descriptors (716) in a pending descriptor queue (714) according to the method of FIG. 7 by storing the new data descriptors (716) in the next available slot of the pending descriptor queue (714).

The method of FIG. 7 includes establishing (718), by the messaging module (160), interrupt criteria that specify when to replenish the injection FIFO buffer (628) with the plurality of new data descriptors (716) in the pending descriptor queue (714). Establishing (718), by the messaging module (160), interrupt criteria according to the method of FIG. 7 is carried out by setting (720) an interrupt timer (722). The interrupt timer (722) of FIG. 7 represents a timer that generates an interrupt when the timer expires that allows the messaging module (160) to resume processor control. The messaging module (160) may set (720) the interrupt timer (722) according to the method of FIG. 7 by initializing the interrupt timer (722) with a initial counter value that is predetermined or based on historical metrics measuring the time period required by the DMA engine (197) to process all the data descriptors in the injection FIFO buffer (628).

The method of FIG. 7 also includes injecting (724), by the messaging module (160), the plurality of new data descriptors (716) into the injection FIFO buffer (628) in dependence upon the interrupt criteria. Injecting (724), by the messaging module (160), the plurality of new data descriptors (716) into the injection FIFO buffer (628) in dependence upon the interrupt criteria according to the method of FIG. 7 is carried out by injecting (726) the plurality of new data descriptors (716) into the injection FIFO buffer (628) when the interrupt timer (722) has expired. The messaging module (160) may inject (726) the plurality of new data descriptors (716) into the injection FIFO buffer (628) according to the method of FIG. 7 by retrieving the plurality of new data descriptors (716) from the pending descriptor queue (714) and storing the plurality of new data descriptors (716) in the next available slots of the injection FIFO buffer (628). Readers will note that injecting (726) the plurality of new data descriptors (716) into the injection FIFO buffer (628) when the interrupt timer (722) has expired advantageously interrupts the processor only periodically in order to efficiently move multiple data descriptors from the pending descriptor queue (714) to the injection FIFO buffer (628) during a single interrupt rather than generating an interrupt after each descriptor in the injection FIFO buffer (628) is processed in order to move a single data descriptor from the pending descriptor queue (714) to the injection FIFO buffer (628) at a time.

FIG. 7 describes establishing interrupt criteria by setting an interrupt timer. As mentioned above, however, establishing interrupt criteria may also be carried out by injecting a replenish descriptor in the DMA injection FIFO buffer. For further explanation, therefore, FIG. 8 sets forth a flow chart illustrating a further exemplary method for replenishing data descriptors in a DMA injection FIFO buffer according to the present invention that includes injecting (800) a replenish descriptor (712) in the injection FIFO buffer (628) for a local memory FIFO transfer.

Figure 8:
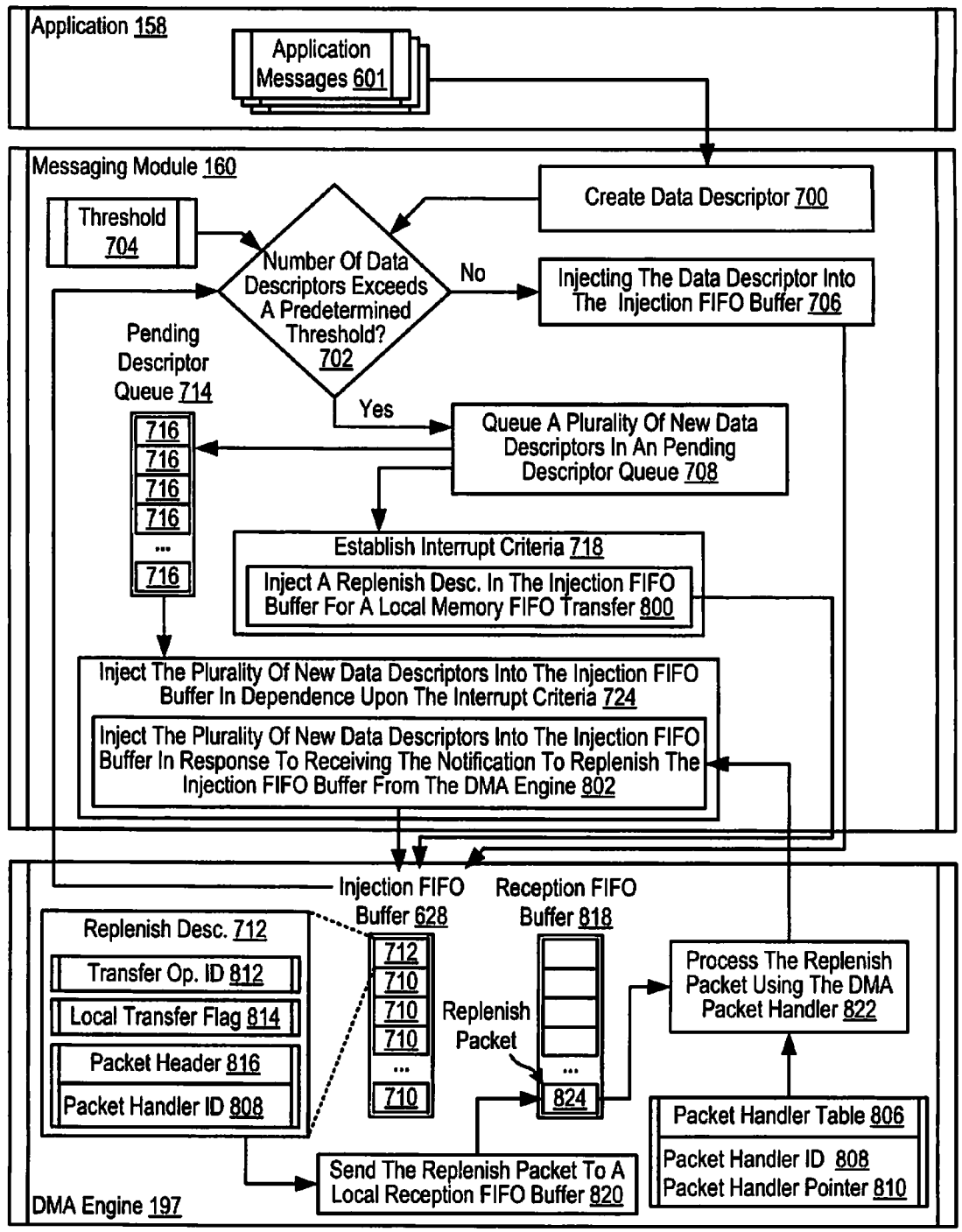
FIG. 8 sets forth a flow chart illustrating a further exemplary method for replenishing data descriptors in a DMA injection FIFO buffer according to the present invention.

The method of FIG. 8 is similar to the method of FIG. 7. That is, the method of FIG. 8 includes: creating (700), by the messaging module (160), a data descriptor for an application message (601) of an application (158); determining (702), by a messaging module (160) on an origin compute node, whether a number of data descriptors (710) in a DMA injection FIFO buffer (628) exceeds a predetermined threshold (704); injecting (706), by the messaging module (160), the data descriptor into the injection FIFO buffer (706) if the number of the data descriptors (710) in the DMA injection FIFO buffer (628) does not exceed the predetermined threshold (704); if the number of the data descriptors (710) in the DMA injection FIFO buffer (628) exceeds the predetermined threshold (704), queuing (708), by the messaging module (160), a plurality of new data descriptors (716) in a pending descriptor queue (714); establishing (718), by the messaging module (160), interrupt criteria that specify when to replenish the injection FIFO buffer (628) with the plurality of new data descriptors (716) in the pending descriptor queue (714); and injecting (724), by the messaging module (160), the plurality of new data descriptors (716) into the injection FIFO buffer (628) in dependence upon the interrupt criteria.

The method of FIG. 8 differs from the method of FIG. 7 in that establishing (718), by the messaging module (160), interrupt criteria is carried out by injecting (800) a replenish descriptor (712) in the injection FIFO buffer (628) for a local memory FIFO transfer. A local memory FIFO transfer operation is a memory FIFO data transfer operation for which the origin compute node and the target compute node are the same compute node. That is, a compute node transfers data to itself in a local memory FIFO transfer operation. As mentioned above, a replenish descriptor is a special type of data descriptor specifying a DMA data transfer operation carried out locally on the origin compute node to notify the messaging module when to replenish the injection FIFO buffer with the plurality of new data descriptors in the pending descriptor queue. In the example of FIG. 8, the replenish descriptor (712) specifies a packet header (816) for a replenish packet (824). The packet header (816) of FIG. 8 specifies a DMA packet handler for notifying the messaging module (160) to replenish the injection FIFO buffer (628) with the plurality of new data descriptors (716). In the example of FIG. 8, the packet header (816) specifies a DMA packet handler using a packet handler identifier (808). The messaging module (160) injects (800) the replenish descriptor (712) in the injection FIFO buffer (628) for a local memory FIFO transfer according to the method of FIG. 8 by storing the replenish descriptor (712) in the next available slot in the injection FIFO buffer (628). A slot is kept available in the injection FIFO buffer (628) by configuring the predetermined threshold lower than the maximum number of slots capable of being stored in the injection FIFO buffer (628).

The method of FIG. 8 also includes sending (820), by a DMA engine (197) on the origin compute node, the replenish packet (824) to a local reception FIFO buffer (818) using the local memory FIFO transfer. The DMA engine (197) may send (820) the replenish packet (824) to a local reception FIFO buffer (818) using the local memory FIFO transfer according to the method of FIG. 8 by retrieving the packet header (816) from the replenish descriptor (712) in the injection FIFO buffer (628), creating the replenish packet (824) having the packet header (816), and transmitting the replenish packet (824) to the reception FIFO buffer (818) using a local memory FIFO data transfer operation as specified by the replenish descriptor (712). The replenish descriptor (712) specifies the local memory FIFO data transfer operation using a transfer operation identifier (812) and a local transfer flag (814). The transfer operation identifier (812) is used to specify whether the particular data transfer operation is a memory FIFO transfer operation or a direct put transfer operation. The location transfer flag (814) indicates whether the data transfer operation is carried out locally such that the origin compute node and the target compute node for the operation are the same compute node. In the example of FIG. 8, the transfer operation identifier (812) specifies that the data transfer operation is a memory FIFO data transfer operation, and the local transfer flag (814) is set to indicate that the transfer is a local transfer.

The method of FIG. 8 also includes processing (822), by the DMA engine (197), the replenish packet (824) using the DMA packet handler specified in the packet header (816) of the replenish packet (712). Processing (822), by the DMA engine (197), the replenish packet (824) using the DMA packet handler specified in the packet header (816) of the replenish packet (712) according to the method of FIG. 8 includes triggering an interrupt that returns processor control to the messaging module (160) when the replenish packet (824) arrives in the reception FIFO buffer (818), thereby notifying the messaging module (160) to replenish the injection FIFO buffer (628). The DMA engine (197) may then go on to process (822) the replenish packet (824) using the DMA packet handler specified in the packet header (816) of the replenish packet (712) according to the method of FIG. 8 by retrieving, from a packet handler table (806), a pointer (810) to a packet handler function associated with the packet handler identifier (808) specified in the packet header (816) of the replenish packet (824) and calling the packet handler function identified by the retrieved pointer (810).

As mentioned above, the method of FIG. 8 includes injecting (724), by the messaging module (160), the plurality of new data descriptors (716) into the injection FIFO buffer (628) in dependence upon the interrupt criteria. Injecting (724), by the messaging module (160), the plurality of new data descriptors (716) into the injection FIFO buffer (628) in dependence upon the interrupt criteria according to the method of FIG. 8 includes injecting (802) the plurality of new data descriptors (716) into the injection FIFO buffer (628) in response to receiving the notification to replenish the injection FIFO buffer (628) from the DMA engine (197). The messaging module (160) may inject (802) the plurality of new data descriptors (716) into the injection FIFO buffer (628) according to the method of FIG. 8 by retrieving the plurality of new data descriptors (716) from the pending descriptor queue (714) and storing the plurality of new data descriptors (716) in the next available slots of the injection FIFO buffer (628) when processing control returns to the messaging module (160). As mentioned above, processing control returns to the messaging module (160) through the interrupt generated by the DMA engine (197) notifying the messaging module (160) to replenish the injection FIFO buffer (628) with the plurality of new data descriptors (716) in the pending descriptor queue (714). Readers will note that injecting (802) the plurality of new data descriptors (716) into the injection FIFO buffer (628) in response to receiving the notification to replenish the injection FIFO buffer (628) from the DMA engine (197) advantageously interrupts the processor only periodically in order to efficiently move multiple data descriptors from the pending descriptor queue (714) to the injection FIFO buffer (628) during a single interrupt rather than generating an interrupt after each descriptor in the injection FIFO buffer (628) is processed in order to move a single data descriptor from the pending descriptor queue (714) to the injection FIFO buffer (628) at a time.

In the example of FIG. 8, the messaging module establishes interrupt criteria by injecting a replenish descriptor in a DMA injection FIFO buffer for a local memory FIFO transfer. Readers will note, however, that the messaging module may also establish interrupt criteria by injecting a replenish descriptor in a DMA injection FIFO buffer for a local direct put operation. For further explanation, therefore, FIG. 9 sets forth a flow chart illustrating a further exemplary method for replenishing data descriptors in a DMA injection FIFO buffer according to the present invention that includes injecting (900) a replenish descriptor (712) in the injection FIFO buffer (628) for a local direct put operation.

Figure 9:
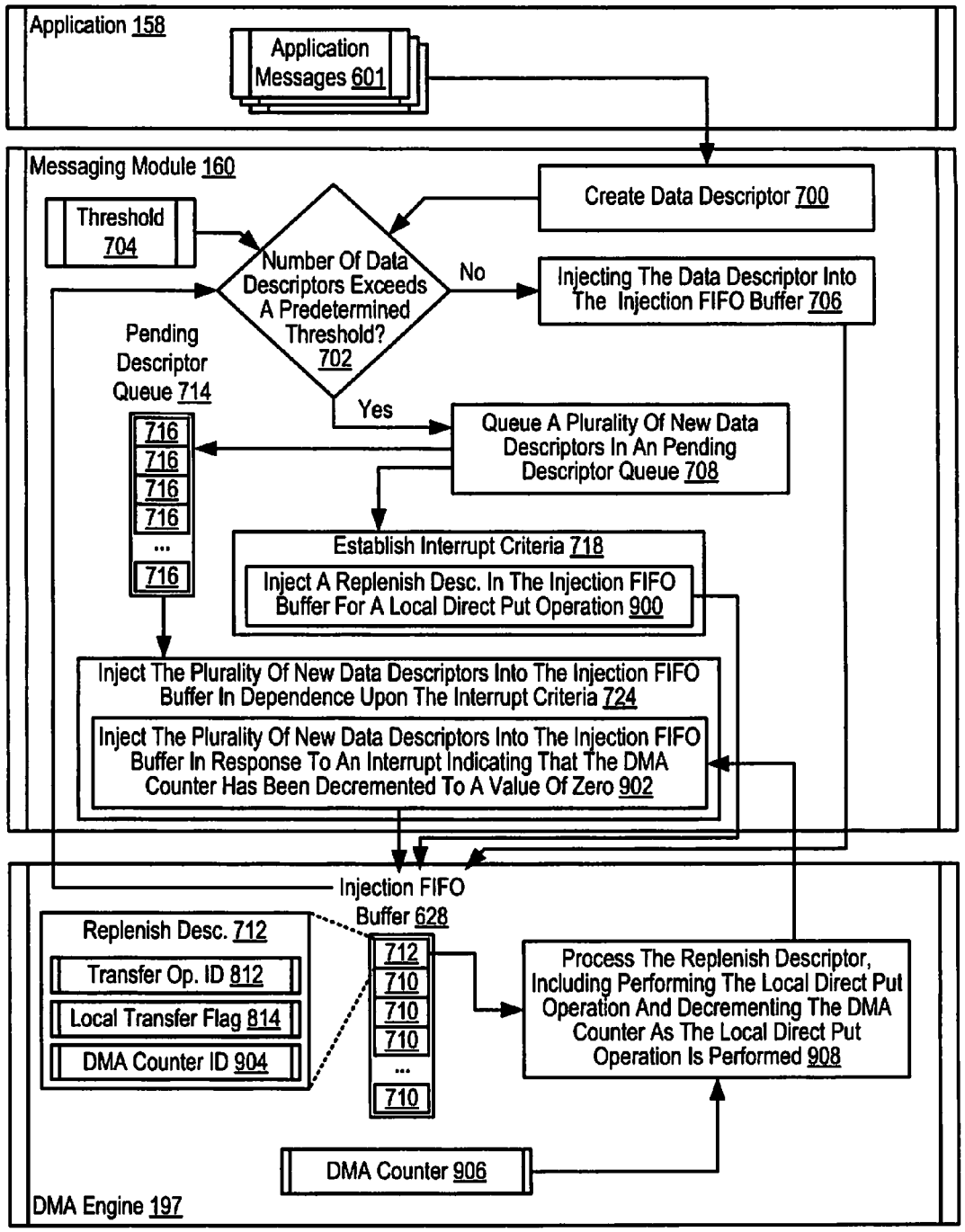
FIG. 9 sets forth a flow chart illustrating a further exemplary method for replenishing data descriptors in a DMA injection FIFO buffer according to the present invention.

The method of FIG. 9 is similar to the method of FIG. 7. That is, the method of FIG. 9 includes: creating (700), by the messaging module (160), a data descriptor for an application message (601) of an application (158); determining (702), by a messaging module (160) on an origin compute node, whether a number of data descriptors (710) in a DMA injection FIFO buffer (628) exceeds a predetermined threshold (704); injecting (706), by the messaging module (160), the data descriptor into the injection FIFO buffer (706) if the number of the data descriptors (710) in the DMA injection FIFO buffer (628) does not exceed the predetermined threshold (704); if the number of the data descriptors (710) in the DMA injection FIFO buffer (628) exceeds the predetermined threshold (704), queuing (708), by the messaging module (160), a plurality of new data descriptors (716) in a pending descriptor queue (714); establishing (718), by the messaging module (160), interrupt criteria that specify when to replenish the injection FIFO buffer (628) with the plurality of new data descriptors (716) in the pending descriptor queue (714); and injecting (724), by the messaging module (160), the plurality of new data descriptors (716) into the injection FIFO buffer (628) in dependence upon the interrupt criteria.

The method of FIG. 9 differs from the method of FIG. 7 in that establishing (718), by the messaging module (160), interrupt criteria is carried out by injecting (900) a replenish descriptor (712) in the injection FIFO buffer (628) for a local direct put operation. A local direct put transfer operation is a direct put operation for which the origin compute node and the target compute node are the same compute node. That is, a compute node transfers data to itself in a local direct put transfer operation. As mentioned above, a replenish descriptor is a special type of data descriptor specifying a DMA data transfer operation carried out locally on the origin compute node to notify the messaging module when to replenish the injection FIFO buffer with the plurality of new data descriptors in the pending descriptor queue. In the example of FIG. 9, the replenish descriptor (712) specifies a DMA counter (906). The DMA counter (906) of FIG. 9 represents a dedicated DMA counter assigned to the replenish descriptor (712). The DMA counter is dedicated in the sense that it is not a shared DMA counter utilized concurrently in multiple DMA transfer operations.

The method of FIG. 9 includes processing (908), by a DMA engine (197) on the origin compute node, the replenish descriptor (712). The DMA engine (197) may process (908) the replenish descriptor (712) according to the method of FIG. 9 by initializing the DMA counter (906) to the size of the data to be transferred using the direct put operation. The size of the data to be transferred is typically included in the metadata of the replenish descriptor (712). The replenish descriptor (712) of FIG. 9 specifies a local direct put operation using a transfer operation identifier (812) and a local transfer flag (814). The transfer operation identifier (812) is used to specify whether the particular data transfer operation is a memory FIFO transfer operation or a direct put transfer operation. The location transfer flag (814) indicates whether the data transfer operation is carried out locally such that the origin compute node and the target compute node for the operation are the same compute node. In the example of FIG. 9, the transfer operation identifier (812) specifies that the data transfer operation is a direct put transfer operation, and the local transfer flag (814) is set to indicate that the transfer is a local transfer. Processing (908), by a DMA engine (197) on the origin compute node, the replenish descriptor (712) according to the method of FIG. 9 includes performing the local direct put operation and decrementing the DMA counter (906) as the local direct put operation is performed. When the DMA counter (906) has been decremented to a value of zero, then a hit zero interrupt is triggered that results in processing control returning to the messaging module (160).

As mentioned above, the method of FIG. 9 includes injecting (724), by the messaging module (160), the plurality of new data descriptors (716) into the injection FIFO buffer (628) in dependence upon the interrupt criteria. Injecting (724), by the messaging module (160), the plurality of new data descriptors (716) into the injection FIFO buffer (628) in dependence upon the interrupt criteria according to the method of FIG. 9 includes injecting (902) the plurality of new data descriptors (716) into the injection FIFO buffer (628) in response to an interrupt indicating that the DMA counter (906) has been decremented to a value of zero. The messaging module (160) may inject (902) the plurality of new data descriptors (716) into the injection FIFO buffer (628) according to the method of FIG. 9 by retrieving the plurality of new data descriptors (716) from the pending descriptor queue (714) and storing the plurality of new data descriptors (716) in the next available slots of the injection FIFO buffer (628) when processing control returns to the messaging module (160). As mentioned above, processing control returns to the messaging module (160) through the interrupt generated when the DMA counter (906) has been decremented to a value of zero. Readers will note that injecting (902) the plurality of new data descriptors (716) into the injection FIFO buffer (628) in response to an interrupt indicating that the DMA counter (906) has been decremented to a value of zero advantageously interrupts the processor only periodically in order to efficiently move multiple data descriptors from the pending descriptor queue (714) to the injection FIFO buffer (628) during a single interrupt rather than generating an interrupt after each descriptor in the injection FIFO buffer (628) is processed in order to move a single data descriptor from the pending descriptor queue (714) to the injection FIFO buffer (628) at a time.

In the example of FIG. 9, readers will note that the replenish descriptor was assigned a dedicated DMA counter used to generate an interrupt that returned processor control to the messaging module. In some embodiments, however, the replenish descriptor may be assigned a shared DMA counter that is unable to properly trigger an interrupt to return processor control to the messaging module, and thereby allow the messaging module to replenish the DMA injection FIFO buffer with new data descriptors. When the replenish descriptor is assigned a shared DMA counter, the DMA engine may perform a local direct put operation to interrupt-on-touch memory capable of generating the interrupt to return processor control to the messaging module. Interrupt-on-touch memory is a type of memory that generates an interrupt each time the memory is accessed. For further explanation, therefore, FIG. 10 sets forth a flow chart illustrating a further exemplary method for replenishing data descriptors in a DMA injection FIFO buffer according to the present invention in which a replenish descriptor (712) specifies a location (924) in interrupt-on-touch memory (928).

Figure 10:
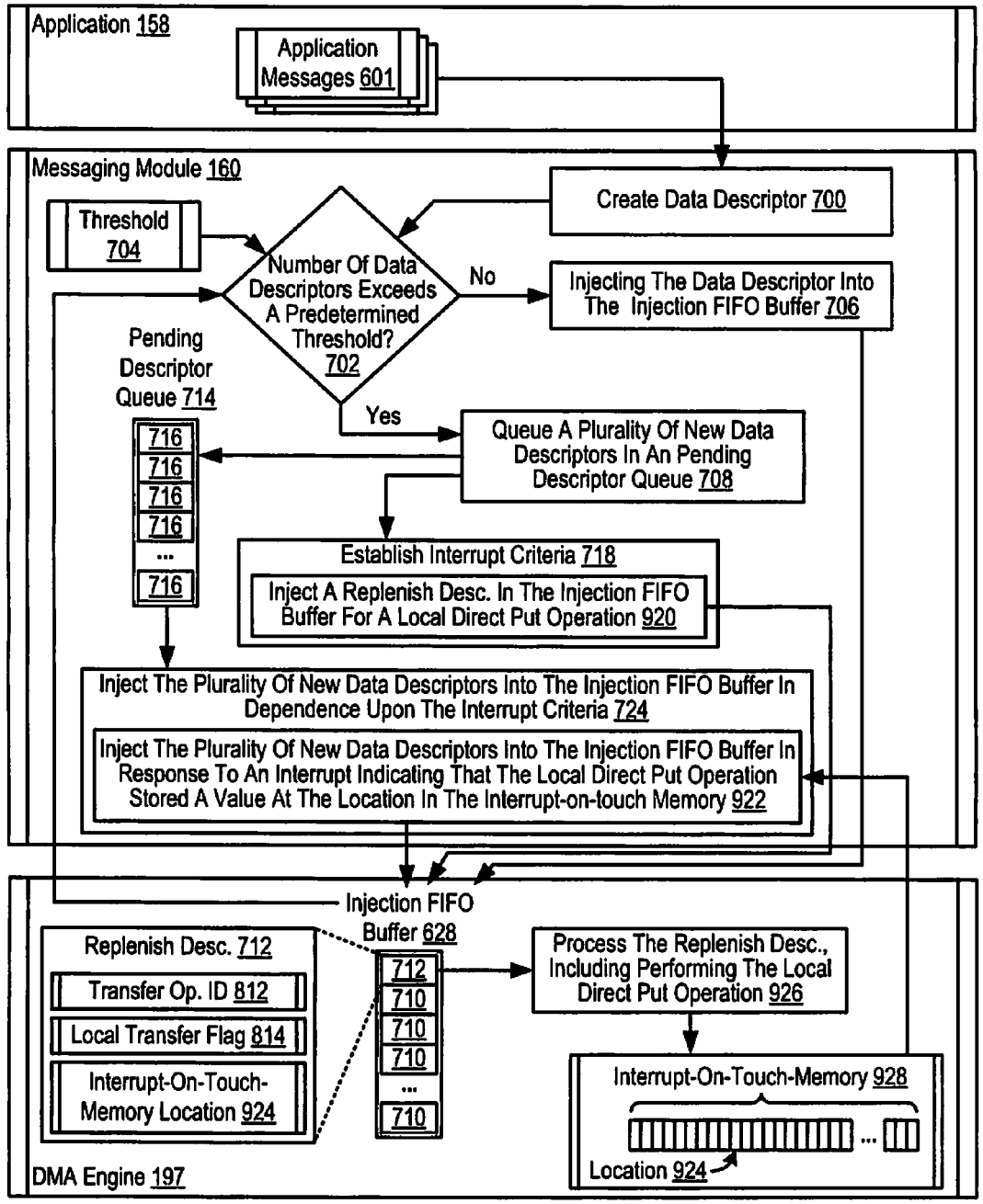
FIG. 10 sets forth a flow chart illustrating a further exemplary method for replenishing data descriptors in a DMA injection FIFO buffer according to the present invention.

The method of FIG. 10 is similar to the method of FIG. 7. That is, the method of FIG. 10 includes: creating (700), by the messaging module (160), a data descriptor for an application message (601) of an application (158); determining (702), by a messaging module (160) on an origin compute node, whether a number of data descriptors (710) in a DMA injection FIFO buffer (628) exceeds a predetermined threshold (704); injecting (706), by the messaging module (160), the data descriptor into the injection FIFO buffer (706) if the number of the data descriptors (710) in the DMA injection FIFO buffer (628) does not exceed the predetermined threshold (704); if the number of the data descriptors (710) in the DMA injection FIFO buffer (628) exceeds the predetermined threshold (704), queuing (708), by the messaging module (160), a plurality of new data descriptors (716) in a pending descriptor queue (714); establishing (718), by the messaging module (160), interrupt criteria that specify when to replenish the injection FIFO buffer (628) with the plurality of new data descriptors (716) in the pending descriptor queue (714); and injecting (724), by the messaging module (160), the plurality of new data descriptors (716) into the injection FIFO buffer (628) in dependence upon the interrupt criteria.

The method of FIG. 10 differs from the method of FIG. 7 in that establishing (718), by the messaging module (160), interrupt criteria is carried out by injecting (920) a replenish descriptor (712) in the injection FIFO buffer (628) for a local direct put operation. As mentioned above, the replenish descriptor (712) specifies a location (924) in interrupt-on-touch memory (928) for transferring data using a local direct put operation. Transferring data to the location (924) in interrupt-on-touch memory (928) generates an interrupt that returns processor control to the messaging module, thereby allowing the messaging module to replenish the injection FIFO buffer (628) with the new data descriptors (716) in the pending descriptor queue (714).

The method of FIG. 10 also includes processing (926), by a DMA engine (197) on the origin compute node, the replenish descriptor (712), including performing the local direct put operation. The DMA engine (197) processes (926) the replenish descriptor (712) according to the method of FIG. 10 by storing data specified in the replenish descriptor (712) at the location (924) in interrupt-on-touch memory (928). Upon storing the data in interrupt-on-touch memory (928), an interrupt is generated that returns processing control to the messaging module (160).

As mentioned above, the method of FIG. 10 includes injecting (724), by the messaging module (160), the plurality of new data descriptors (716) into the injection FIFO buffer (628) in dependence upon the interrupt criteria. Injecting (724), by the messaging module (160), the plurality of new data descriptors (716) into the injection FIFO buffer (628) in dependence upon the interrupt criteria according to the method of FIG. 10 includes injecting (922) the plurality of new data descriptors (716) into the injection FIFO buffer (628) in response to an interrupt indicating that the local direct put operation stored a value at the location (924) in the interrupt-on-touch memory (928). The messaging module (160) may inject (922) the plurality of new data descriptors (716) into the injection FIFO buffer (628) according to the method of FIG. 10 by retrieving the plurality of new data descriptors (716) from the pending descriptor queue (714) and storing the plurality of new data descriptors (716) in the next available slots of the injection FIFO buffer (628) when processing control returns to the messaging module (160). As mentioned above, processing control returns to the messaging module (160) through the interrupt generated when the DMA engine (197) performs a direct put operation to store data specified by the replenish descriptor (712) in interrupt-on-touch memory (928). Readers will note that injecting (922) the plurality of new data descriptors (716) into the injection FIFO buffer (628) in response to an interrupt indicating that the local direct put operation stored a value at the location (924) in the interrupt-on-touch memory (928) advantageously interrupts the processor only periodically in order to efficiently move multiple data descriptors from the pending descriptor queue (714) to the injection FIFO buffer (628) during a single interrupt rather than generating an interrupt after each descriptor in the injection FIFO buffer (628) is processed in order to move a single data descriptor from the pending descriptor queue (714) to the injection FIFO buffer (628) at a time.

Exemplary embodiments of the present invention are described largely in the context of a fully functional computer system for replenishing data descriptors in a DMA injection FIFO buffer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of replenishing data descriptors in a Direct Memory Access ('DMA') injection first-in-first-out ('FIFO') buffer, the method comprising:

determining, by a messaging module on an origin compute node, whether a number of data descriptors in a DMA injection FIFO buffer exceeds a predetermined threshold, each data descriptor specifying an application message for transmission to a target compute node;

queuing, by the messaging module, a plurality of new data descriptors in a pending descriptor queue if the number of the data descriptors in the DMA injection FIFO buffer exceeds the predetermined threshold;

establishing, by the messaging module, interrupt criteria that specify when to replenish the injection FIFO buffer with the plurality of new data descriptors in the pending descriptor queue, wherein establish interrupt criteria includes injecting a replenish descriptor in the injection FIFO buffer, the replenish descriptor specifying a DMA data transfer operation to notify the messaging module when to replenish the injection FIFO buffer with the plurality of new data descriptors in the pending descriptor queue; and injecting, by the messaging module, the plurality of new data descriptors into the injection FIFO buffer in dependence upon the interrupt criteria.

2. The method of claim 1 wherein:

establishing, by the messaging module, interrupt criteria that specify when to replenish the injection FIFO buffer with the plurality of new data descriptors in the pending descriptor queue further comprises setting an interrupt timer; and injecting, by the messaging module, the plurality of new data descriptors into the injection FIFO buffer in dependence upon the interrupt criteria further comprises injecting the plurality of new data descriptors into the injection FIFO buffer when the interrupt timer has expired.

3. The method of claim 1 wherein:

establishing, by the messaging module, interrupt criteria that specify when to replenish the injection FIFO buffer with the plurality of new data descriptors in the pending descriptor queue wherein the replenish descriptor is injected in the injection FIFO buffer for a local memory FIFO transfer, the replenish descriptor specifying a packet header for a replenish packet, the packet header specifying a DMA packet handler for notifying the messaging module to replenish the injection FIFO buffer with the plurality of new data descriptors;

the method further comprises:

sending, by a DMA engine on the origin compute node, the replenish packet to a local reception FIFO buffer using the local memory FIFO transfer, and processing, by the DMA engine, the replenish packet using the DMA packet handler specified in the packet header of the replenish packet; and injecting, by the messaging module, the plurality of new data descriptors into the injection FIFO buffer in dependence upon the interrupt criteria further comprises injecting the plurality of new data descriptors into the injection FIFO buffer in response to receiving the notification to replenish the injection FIFO buffer from the DMA engine.

4. The method of claim 1 wherein:

establishing, by the messaging module, interrupt criteria that specify when to replenish the injection FIFO buffer with the plurality of new data descriptors in the pending descriptor queue wherein the replenish descriptor is injected in the injection FIFO buffer for a local direct put operation, the replenish descriptor specifying a DMA counter;

the method further comprises processing, by a DMA engine on the origin compute node, the replenish descriptor, including performing the local direct put operation and decrementing the DMA counter as the local direct put operation is performed; and injecting, by the messaging module, the plurality of new data descriptors into the injection FIFO buffer in dependence upon the interrupt criteria further comprises injecting the plurality of new data descriptors into the injection FIFO buffer in response to an interrupt indicating that the DMA counter has been decremented to a value of zero.

5. The method of claim 1 wherein:

establishing, by the messaging module, interrupt criteria that specify when to replenish the injection FIFO buffer with the plurality of new data descriptors in the pending descriptor queue wherein the replenish descriptor is injected in the injection FIFO buffer for a local direct put operation, the replenish descriptor specifying a location in interrupt-on-touch memory;

the method further comprises processing, by a DMA engine on the origin compute node, the replenish descriptor, including performing the local direct put operation; and injecting, by the messaging module, the plurality of new data descriptors into the injection FIFO buffer in dependence upon the interrupt criteria further comprises injecting the plurality of new data descriptors into the injection FIFO buffer in response to an interrupt indicating that the local direct put operation stored a value at the location in the interrupt-on-touch memory.

6. The method of claim 1 wherein the origin compute node and the target compute node are comprised in a parallel computer, the parallel computer comprising a plurality of compute nodes connected for data communications through a data communications network, the data communications network configured for point to point data communications.

7. An origin compute node replenishing data descriptors in a Direct Memory Access ('DMA') injection first-in-first-out ('FIFO') buffer, the compute node comprising a computer processor, a DMA controller having a DMA engine, and computer memory operatively coupled to the computer processor and the DMA controller, the computer memory having disposed within it computer program instructions:

determining, by a messaging module on an origin compute node, whether a number of data descriptors in a DMA injection FIFO buffer exceeds a predetermined threshold, each data descriptor specifying an application message for transmission to a target compute node;

queuing, by the messaging module, a plurality of new data descriptors in a pending descriptor queue if the number of the data descriptors in the DMA injection FIFO buffer exceeds the predetermined threshold;

establishing, by the messaging module, interrupt criteria that specify when to replenish the injection FIFO buffer with the plurality of new data descriptors in the pending descriptor queue, wherein establish interrupt criteria includes injecting a replenish descriptor in the injection FIFO buffer, the replenish descriptor specifying a DMA data transfer operation to notify the messaging module when to replenish the injection FIFO buffer with the plurality of new data descriptors in the pending descriptor queue; and injecting, by the messaging module, the plurality of new data descriptors into the injection FIFO buffer in dependence upon the interrupt criteria.

8. The origin compute node of claim 7 wherein:

establishing, by the messaging module, interrupt criteria that specify when to replenish the injection FIFO buffer with the plurality of new data descriptors in the pending descriptor queue further comprises setting an interrupt timer; and injecting, by the messaging module, the plurality of new data descriptors into the injection FIFO buffer in dependence upon the interrupt criteria further comprises injecting the plurality of new data descriptors into the injection FIFO buffer when the interrupt timer has expired.

9. The origin compute node of claim 7 wherein:

establishing, by the messaging module, interrupt criteria that specify when to replenish the injection FIFO buffer with the plurality of new data descriptors in the pending descriptor queue wherein the replenish descriptor is injected in the injection FIFO buffer for a local memory FIFO transfer, the replenish descriptor specifying a packet header for a replenish packet, the packet header specifying a DMA packet handler for notifying the messaging module to replenish the injection FIFO buffer with the plurality of new data descriptors;

the computer memory also has disposed within it computer program instructions:

sending, by a DMA engine on the origin compute node, the replenish packet to a local reception FIFO buffer using the local memory FIFO transfer, and processing, by the DMA engine, the replenish packet using the DMA packet handler specified in the packet header of the replenish packet; and injecting, by the messaging module, the plurality of new data descriptors into the injection FIFO buffer in dependence upon the interrupt criteria further comprises injecting the plurality of new data descriptors into the injection FIFO buffer in response to receiving the notification to replenish the injection FIFO buffer from the DMA engine.

10. The origin compute node of claim 7 wherein:

establishing, by the messaging module, interrupt criteria that specify when to replenish the injection FIFO buffer with the plurality of new data descriptors in the pending descriptor queue wherein the replenish descriptor is injected in the injection FIFO buffer for a local direct put operation, the replenish descriptor specifying a DMA counter;

the computer memory also has disposed within it computer program instructions processing, by a DMA engine on the origin compute node, the replenish descriptor, including performing the local direct put operation and decrementing the DMA counter as the local direct put operation is performed; and injecting, by the messaging module, the plurality of new data descriptors into the injection FIFO buffer in dependence upon the interrupt criteria further comprises injecting the plurality of new data descriptors into the injection FIFO buffer in response to an interrupt indicating that the DMA counter has been decremented to a value of zero.

11. The origin compute node of claim 7 wherein:

establishing, by the messaging module, interrupt criteria that specify when to replenish the injection FIFO buffer with the plurality of new data descriptors in the pending descriptor queue wherein the replenish descriptor is injected in the injection FIFO buffer for a local direct put operation, the replenish descriptor specifying a location in interrupt-on-touch memory;

the computer memory also has disposed within it computer program instructions processing, by a DMA engine on the origin compute node, the replenish descriptor, including performing the local direct put operation; and injecting, by the messaging module, the plurality of new data descriptors into the injection FIFO buffer in dependence upon the interrupt criteria further comprises injecting the plurality of new data descriptors into the injection FIFO buffer in response to an interrupt indicating that the local direct put operation stored a value at the location in the interrupt-on-touch memory.

12. The origin compute node of claim 7 wherein the origin compute node and the target compute node are comprised in a parallel computer, the parallel computer comprising a plurality of compute nodes connected for data communications through a data communications network, the data communications network configured for point to point data communications.

13. A computer program product for replenishing data descriptors in a Direct Memory Access ('DMA') injection first-in-first-out ('FIFO') buffer, the computer program product disposed upon a computer readable recordable medium, the computer program product comprising computer program instructions:

determining, by a messaging module on an origin compute node, whether a number of data descriptors in a DMA injection FIFO buffer exceeds a predetermined threshold, each data descriptor specifying an application message for transmission to a target compute node;

queuing, by the messaging module, a plurality of new data descriptors in a pending descriptor queue if the number of the data descriptors in the DMA injection FIFO buffer exceeds the predetermined threshold;

establishing, by the messaging module, interrupt criteria that specify when to replenish the injection FIFO buffer with the plurality of new data descriptors in the pending descriptor queue, wherein establish interrupt criteria includes injecting a replenish descriptor in the injection FIFO buffer, the replenish descriptor specifying a DMA data transfer operation to notify the messaging module when to replenish the injection FIFO buffer with the plurality of new data descriptors in the pending descriptor queue; and injecting, by the messaging module, the plurality of new data descriptors into the injection FIFO buffer in dependence upon the interrupt criteria.

14. The computer program product of claim 13 wherein:

establishing, by the messaging module, interrupt criteria that specify when to replenish the injection FIFO buffer with the plurality of new data descriptors in the pending descriptor queue further comprises setting an interrupt timer; and injecting, by the messaging module, the plurality of new data descriptors into the injection FIFO buffer in dependence upon the interrupt criteria further comprises injecting the plurality of new data descriptors into the injection FIFO buffer when the interrupt timer has expired.

15. The computer program product of claim 13 wherein:

establishing, by the messaging module, interrupt criteria that specify when to replenish the injection FIFO buffer with the plurality of new data descriptors in the pending descriptor queue wherein the replenish descriptor is injected in the injection FIFO buffer for a local memory FIFO transfer, the replenish descriptor specifying a packet header for a replenish packet, the packet header specifying a DMA packet handler for notifying the messaging module to replenish the injection FIFO buffer with the plurality of new data descriptors;

the computer program product further comprises computer program instructions:

sending, by a DMA engine on the origin compute node, the replenish packet to a local reception FIFO buffer using the local memory FIFO transfer, and processing, by the DMA engine, the replenish packet using the DMA packet handler specified in the packet header of the replenish packet; and injecting, by the messaging module, the plurality of new data descriptors into the injection FIFO buffer in dependence upon the interrupt criteria further comprises injecting the plurality of new data descriptors into the injection FIFO buffer in response to receiving the notification to replenish the injection FIFO buffer from the DMA engine.

16. The computer program product of claim 13 wherein:

establishing, by the messaging module, interrupt criteria that specify when to replenish the injection FIFO buffer with the plurality of new data descriptors in the pending descriptor queue wherein the replenish descriptor is injected in the injection FIFO buffer for a local direct put operation, the replenish descriptor specifying a DMA counter;

the computer program product further comprises computer program instructions processing, by a DMA engine on the origin compute node, the replenish descriptor, including performing the local direct put operation and decrementing the DMA counter as the local direct put operation is performed; and injecting, by the messaging module, the plurality of new data descriptors into the injection FIFO buffer in dependence upon the interrupt criteria further comprises injecting the plurality of new data descriptors into the injection FIFO buffer in response to an interrupt indicating that the DMA counter has been decremented to a value of zero.

17. The computer program product of claim 13 wherein:

establishing, by the messaging module, interrupt criteria that specify when to replenish the injection FIFO buffer with the plurality of new data descriptors in the pending descriptor queue wherein the replenish descriptor is injected in the injection FIFO buffer for a local direct put operation, the replenish descriptor specifying a location in interrupt-on-touch memory;

the computer program product further comprises computer program instructions processing, by a DMA engine on the origin compute node, the replenish descriptor, including performing the local direct put operation; and injecting, by the messaging module, the plurality of new data descriptors into the injection FIFO buffer in dependence upon the interrupt criteria further comprises injecting the plurality of new data descriptors into the injection FIFO buffer in response to an interrupt indicating that the local direct put operation stored a value at the location in the interrupt-on-touch memory.

18. The computer program product of claim 13 wherein the origin compute node and the target compute node are comprised in a parallel computer, the parallel computer comprising a plurality of compute nodes connected for data communications through a data communications network, the data communications network configured for point to point data communications.

* * * * *